(12) United States Patent
Jamadagni (10) Patent No.: US 9,351,317 B2
(45) Date of Patent: May 24, 2016

(54) METHOD AND DEVICE OF MANAGING MTC DEVICES IN AN MTC NETWORK ENVIRONMENT

(75) Inventor: Satish Nanjunda Swamy Jamadagni, Bangalore (IN)

(73) Assignee: Samsung Electronics Co., Ltd (KR)

( * ) Notice: Subject to any disclaimer, the term of this patent is extended or adjusted under 35 U.S.C. 154(b) by 154 days.

(21) Appl. No.: 13/641,164

(22) PCT Filed: Apr. 15, 2011

(86) PCT No.: PCT/KR2011/002693
§ 371 (c)(1),
(2), (4) Date: Oct. 15, 2012

(87) PCT Pub. No.: WO2011/129643
PCT Pub. Date: Oct. 20, 2011

(65) Prior Publication Data
US 2013/0039245 A1    Feb. 14, 2013

(30) Foreign Application Priority Data

Apr. 15, 2010   (IN) .......................... 1064/CHE/2010

(51) Int. Cl.
*H04W 52/02*    (2009.01)
*H04W 74/04*    (2009.01)
(52) U.S. Cl.
CPC .......... *H04W 74/04* (2013.01); *H04W 52/0216* (2013.01)
(58) Field of Classification Search
CPC ..................................................... H04W 74/04
USPC ................. 370/232, 236, 236.2, 301, 395.21, 370/395.4, 468, 470, 509–512, 331, 332, 370/418, 419; 455/432.1–432.3
See application file for complete search history.

(56) References Cited

U.S. PATENT DOCUMENTS

| | | | |
|---|---|---|---|
| 7,301,950 B1 * | 11/2007 | Cheong et al. ........... | 370/395.21 |
| 7,792,554 B2 * | 9/2010 | Abdel-Kader ................ | 455/574 |
| 8,363,625 B2 * | 1/2013 | Yeo et al. ...................... | 370/336 |
| 2005/0119008 A1 * | 6/2005 | Haumont ................... | 455/456.1 |
| 2010/0093349 A1 * | 4/2010 | Gandhi et al. ............. | 455/435.2 |
| 2012/0004003 A1 * | 1/2012 | Shaheen et al. ............... | 455/509 |
| 2013/0100895 A1 * | 4/2013 | Aghili et al. .................. | 370/329 |

OTHER PUBLICATIONS

3GPP TS 22.368 V10.0.0 (Mar. 2010), "3rd Generation Partnership Project; Technical Specification Group Services and System Aspects; Service requirements for Machine-Type Communications (MTC); Stage 1 (Release 10)", Mar. 2010, pp. 25.

(Continued)

*Primary Examiner* — Mang Yeung
*Assistant Examiner* — Natali N Pascual Peguero
(74) *Attorney, Agent, or Firm* — The Farrell Law Firm, P.C.

(57) ABSTRACT

A method and system for managing Machine-to-Machine type Communication (MTC) devices in a MTC network environment are provided. The method includes receiving a notification message including a timer value from an MTC network; entering, upon receiving the notification message including the timer value for a duration equal to the timer value, an inactive mode; entering, upon an expiration of the timer value, an active mode from the inactive mode; and transmitting MTC data to an MTC server associated with the MTC device via the MTC network during the active mode of the MTC device.

22 Claims, 4 Drawing Sheets (56) References Cited

OTHER PUBLICATIONS

3GPP TR 23.888 V0.3.2 (Mar. 2010), "3rd Generation Partnership Project; Technical Specification Group Services and System Aspects; System Improvements for Machine-Type Communications; (Release 10)" Mar. 2010, pp. 33.

3GPP TR 22.868 V8.0.0 (Mar. 2007), "3rd Generation Partnership Project; Technical Specification Group Services and System Aspects; Study on Facilitating Machine to Machine Communication in 3GPP Systems; (Release 8)", Mar. 2007, pp. 15.

PCT/ISA/237 Written Opinion issued on PCT/KR2011/002693 (pp. 5).

PCT/ISA/210 Search Report issued on PCT/KR2011/002693 (pp. 4).

* cited by examiner

METHOD AND DEVICE OF MANAGING MTC DEVICES IN AN MTC NETWORK ENVIRONMENT

PRIORITY

This application is a National Phase Entry of PCT International Application No. PCT/KR2011/002693, which was filed Apr. 15, 2011, and claims priority to Indian Patent Application No. 1064/CHE/2010, filed in the Indian Intellectual Property Office, on April 15, the entire content of each of which is incorporated herein by reference.

BACKGROUND OF THE INVENTION

1. Field of the Invention

The present invention relates generally to the field of Machine-to-Machine (M2M) type communications (MTC), and more particularly to managing MTC devices in an MTC network environment.

2. Description of the Related Art

Machine to Machine (M2M) type communication (MTC) is currently being discussed in the $3^{rd}$ generation partnership project (3GPP) forum, and the requirements for M2M architecture have been specified. Typically, an MTC network environment includes a plurality of MTC devices, an MTC network having a plurality of network cells, and a plurality of MTC servers. One or more MTC devices periodically transmit MTC data intended for an associated MTC server to the MTC network, such that the MTC network communicates the MTC data to the intended MTC server. For example, a smart metering application may the MTC devices to send their data around the same time (e.g., every hour or during a limited time period during off peak hours). However, when a large number of MTC devices are trying to access the MTC network at the same time, a huge amount of resources would be effectively wiped out. Even the MTC devices may suffer from Random Access CHannel (RACH) failures due to successive contention failure.

In order reduce wasted resources, existing time controlled access solutions schedule the MTC devices to wake up at a scheduled time and transmit the MTC data to the MTC network. Upon transmission, the MTC devices go to sleep when the MTC devices are scheduled to sleep based on a static timer value programmed in a Subscriber Identification Module (SIM) card installed in each of the MTC devices. Since the timer value is static, the MTC network has no control over the number of MTC devices accessing the MTC network at a single point of time, thereby affecting the performance of the entire MTC network system.

In another existing solution, the MTC devices go to sleep and wake up to transmit the MTC data based on system information communicated by an associated network cell on which the MTC devices are camping. However, the MTC devices may need to continuously keep reading system information to determine whether the MTC devices are allowed to access the MTC network at a given time.

SUMMARY OF THE INVENTION

The present invention has been made to address at least the above problems and/or disadvantages and to provide at least the advantages described below. Accordingly, an aspect of the present invention provides a method and system for managing machine-to-machine (M2M) type communication (MTC) devices in an MTC network environment.

According to an aspect of the present invention, a method performed by a Machine-to-Machine (M2M) type Communication (MTC) device for communicating MTC data in an MTC network environment is provided. The method includes receiving a notification message including a timer value from an MTC network; entering, upon receiving the notification message including the timer value for a duration equal to the timer value, an inactive mode; entering, upon an expiration of the timer value, an active mode from the inactive mode; and transmitting MTC data to an MTC server associated with the MTC device via the MTC network during the active mode of the MTC device According to another aspect of the present invention, a method performed by a Machine-to-Machine (M2M) type Communication (MTC) network for managing at least one MTC device in an MTC network environment is provided. The method includes sending, to the at least one MTC device, a notification message including a timer value, wherein the timer value indicates an inactive period associated with the at least one MTC device; and receiving, from the at least one MTC device, MTC data intended for an associated MTC server via an associated network cell upon an expiration of the timer value associated with the inactive period.

According to another aspect of the present invention, a Machine-to-Machine (M2M) type Communication (MTC) device for communicating MTC data in an MTC network environment is provided. The device includes a transceiver for receiving a notification message including a timer value from an MTC network; and a processor for entering an inactive mode upon receiving the notification message including the timer value for a duration equal to the timer value, entering an active mode from the inactive mode upon an expiration of the timer value, and controlling the transceiver to transmit MTC data to an MTC server associated with the MTC device via the MTC network during the active mode of the MTC device.

According to another aspect of the present invention, a Machine-to-Machine (M2M) type Communication (MTC) network for managing at least one MTC device in an MTC network environment is provided. The network includes at least one network cell; at least one MTC server; and a processor for controlling the at least one network cell to send, to the at least one MTC device, a notification message including a timer value indicating an inactive period associated with the at least one MTC device, and controlling the at least one network cell to receive, from the at least one MTC device, MTC data intended for an associated MTC server from among the at least one MTC server via an associated network cell upon an expiration of the timer value associated with the inactive period.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail as follows with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 1:
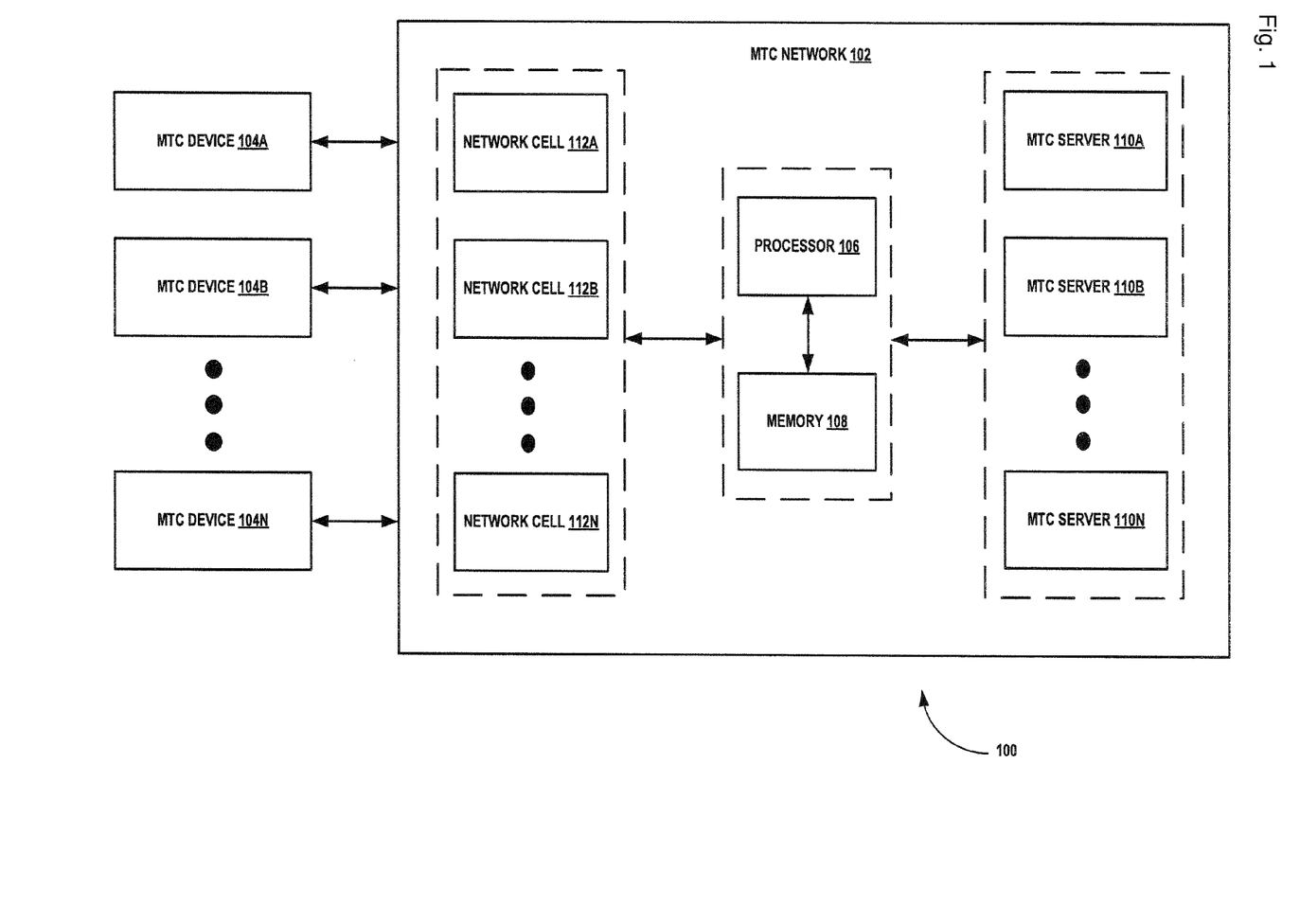
FIG. 1 illustrates a schematic diagram of a Machine-to-Machine (M2M) type communication (MTC) network environment for managing MTC devices by an MTC network, according to an embodiment of the present invention.

FIG. 1 illustrates a schematic diagram of a Machine-to-Machine (M2M) type Communication (MTC) network environment for managing MTC devices by an MTC network, according to an embodiment of the present invention.

Referring to FIG. 1, an MTC network environment 100 includes an MTC network 102 and MTC devices 104A-N. The MTC network 102 includes a processor 106, memory 108, MTC servers 110A-N, and network cells 112A-N.

Each of the MTC devices 104A-N transmits MTC data (e.g., smart meter data, Consumer Electronics (CE) device data, autonomous data from medical devices, etc.) to an associated one of the MTC servers 110A-N in the MTC network 102 via one the network cells 112A-N in a time controller manner. The MTC network 102 communicates a timer value upon complete reception of MTC data from the MTC devices 104A-N. For example, the timer value in the notification message may be a Home Public Land Mobile Network (HPLMN) timer value. The MTC devices 104A-N apply the HPLMN timer value and enter an inactive mode until the HPLMN timer value expires. Further, upon expiration of the HPLMN timer value, the MTC devices 104A-N transition from the inactive mode into the active mode and transmit MTC data to the MTC network 102 via one of the network cells 112A-N. The MTC network 102 then communicates a new HPLMN timer value upon successful reception of the MTC data and the cycle continues.

According to an embodiment of the present invention, the memory 108 temporarily stores instructions that, when executed by the processor 106, cause the processor 106 to generate and transmit an HPLMN timer value to associated one of the MTC devices 104A-N in real time upon successful reception of MTC data from the associated one of the MTC devices 104A-N. The HPLMN timer value communicated to the associated one of MTC devices 104A-N controls a sleep time and a wake up time of the associated one of the MTC devices 104A-N. The process of managing the MTC devices 104A-N described in greater detail as follows with reference to FIGS. 2 and 3.

Figure 2:
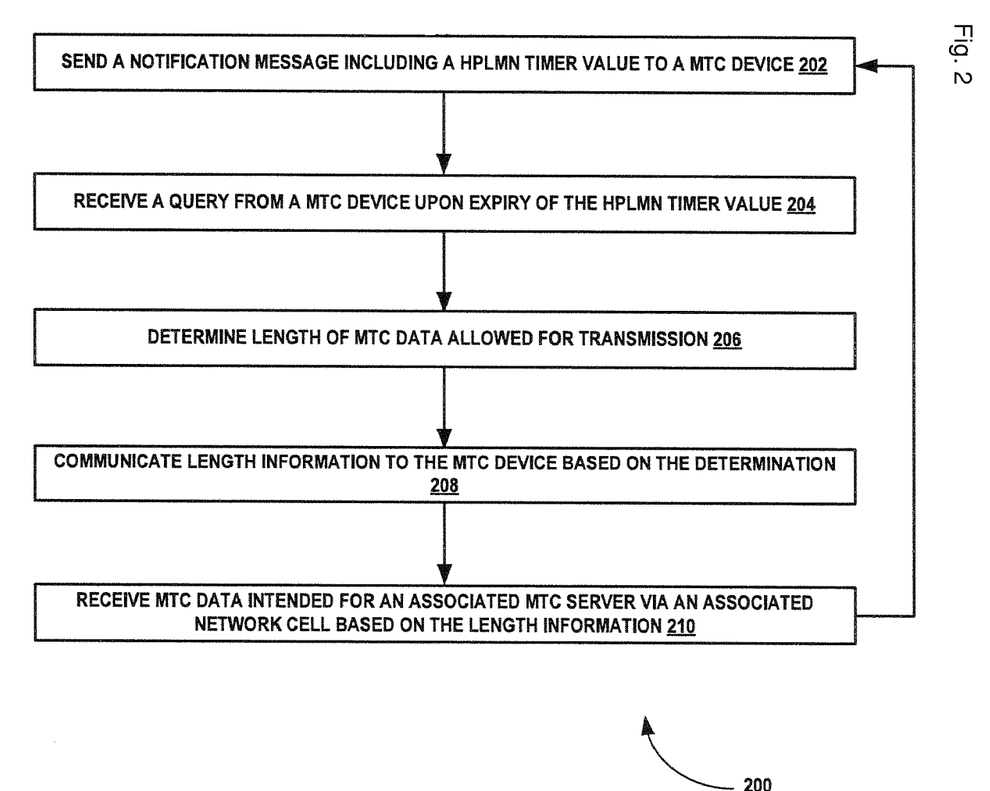
FIG. 2 is a flowchart illustrating a method of managing the MTC devices by an MTC network, according to an embodiment of the present invention.

FIG. 2 is a flowchart illustrating a method, performed by an MTC network, of managing MTC devices, according to an embodiment of the present invention.

For purpose of illustration, the following description refers to a single MTC device 104A, but the method may be performed with respect to a plurality of MTC devices in accordance with embodiments of the present invention. Referring to FIG. 2, in step 202, a notification message including an HPLMN timer value is sent to the MTC device 104A. According to an embodiment of the present invention, during an initial network attach procedure, the MTC network 102 receives an initial network attach message from the MTC device 104A. If the initial network attach message is accepted, the MTC network 102 sends the notification message including the HPLMN timer value to the MTC device 104A. The notification message can be an "Attach accept" message or any other Non Access Stratum (NAS) message that is sent by the MTC network 102 to the MTC device 104A. In step 204, a query is received from the MTC device 104A upon expiration of the HPLMN timer value, in order to determine a maximum length of MTC data allowed for transmission by the MTC device 104A.

In step 206, a length of MTC data allowed for transmission by the MTC device 104A during an active period of the MTC device 104A is determined. In step 208, length information is transmitted to the MTC device 104A according to a result of the length determined during step 206. In step 210, MTC data intended for an associated MTC server (e.g., the MTC server 110A) is received from the MTC device 104A via an associated network cell (e.g., the network cell 112A) based on the length information. The MTC network 102 will reject the MTC data if the MTC device 104A sends the MTC data prior to the expiration of the HPLMN timer. When such a rejection occurs, the process then returns to step 202 upon complete reception of the MTC data. The above-described operations can be achieved without any restrictions on the length of MTC data transmittable by the MTC device 104.

Figure 3:
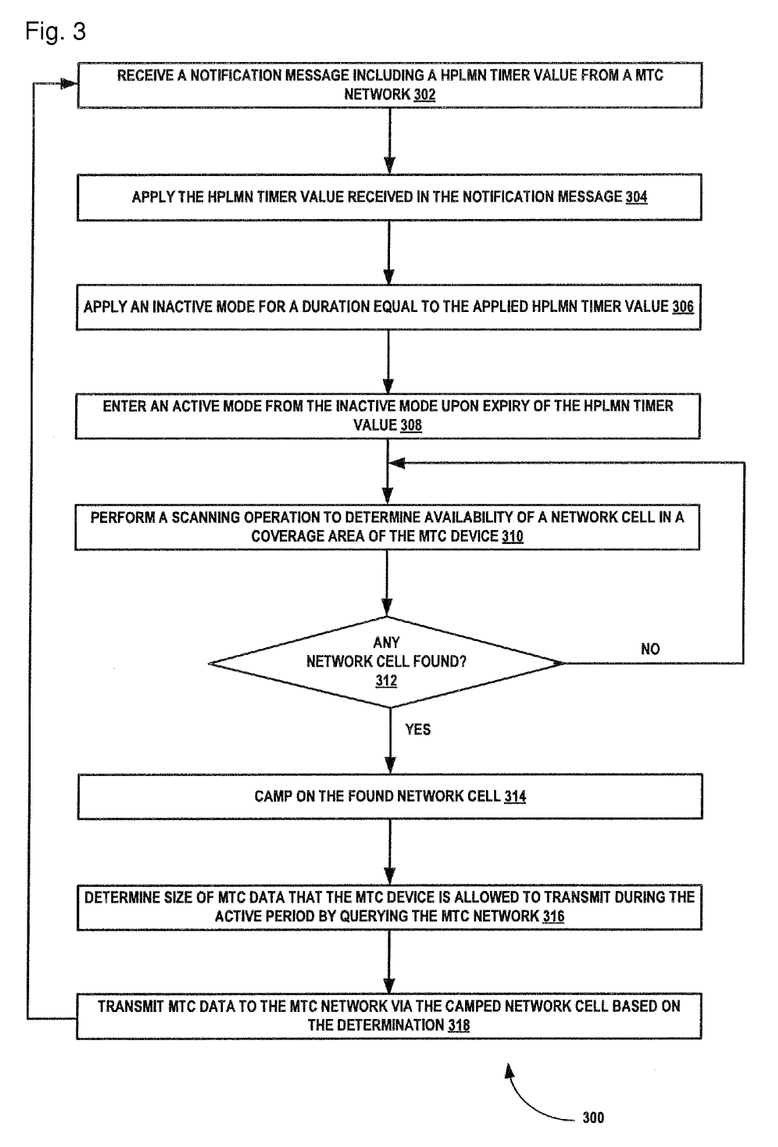
FIG. 3 is a flowchart illustrating a method of communicating MTC data to the MTC network, according to an embodiment of the present invention.

FIG. 3 is a flowchart illustrating a method of communicating MTC data to an MTC network, according to an embodiment of the present invention.

Referring to FIG. 3, in step 302, a notification message including an HPLMN timer value is received from the MTC network 102. According to an embodiment of the present invention, during an initial network attach procedure, the MTC device 104A sends an initial network attach message to the MTC network 102. If the initial network attach message is accepted, the MTC device 104A receives the notification message including the HPLMN timer value from the MTC network 102. In step 304, the HPLMN timer value received in the notification message is applied by the MTC device 104A. In step 306, an inactive mode is applied for a duration equal to the applied HPLMN timer value.

In step 308, an active mode is entered from the inactive mode upon expiry of the applied HPLMN timer value. In step 310, a scanning operation is automatically performed to determine whether any of the network cells 112A-N within a coverage area of the MTC device 104A is available. In step 312, the MTC device 104A determines whether any network cell is found within the coverage area of the MTC device 104A during the scanning operation. If a network cell (e.g., the network cell 112A) is found, then at step 314, the MTC device 104A uses the network cell for camping to transmit MTC data to the MTC server 110A. However, if the MTC device 104A does not find a network cell within the coverage area, the MTC device 104A returns to step 310.

In step 316, the MTC device 104A determines a size of MTC data that the MTC device 104A is allowed to transmit during the active period of the MTC device 104A by querying the MTC network 102 via the camped network cell 112A. In step 318, the MTC device 104A transmits MTC data to the MTC server 110A associated with the MTC device 104A via the MTC network 102 during the active mode of the MTC device 104A based on the determination and the process continues at step 302. For example, the size of the MTC data transmitted to the MTC network 102 during the active period is less than or equal to the determined size of MTC data.

Figure 4:
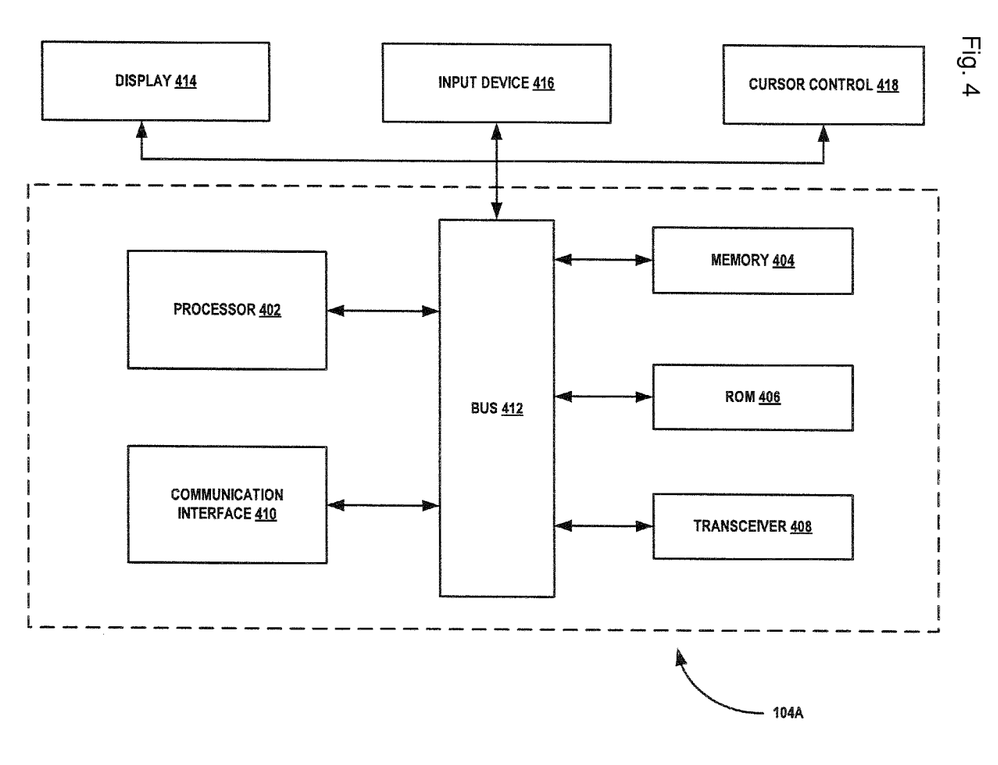
FIG. 4 is a block diagram illustrating an MTC device showing various components according to embodiments of the present invention.

FIG. 4 is a block diagram of an MTC device according to an embodiment of the present subject matter.

Referring to FIG. 4, the MTC device 104A includes a processor 402, memory 404, a Read Only Memory (ROM)

406, a transceiver 408, a bus 410, a communication interface 412, a display 414, an input device 416, and a cursor control 418.

The processor 402 may include any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, smart cards, etc.

The memory 404 and the ROM 406 may include volatile memory and/or non-volatile memory. The memory 404 includes instructions temporarily stored therein to communicate MTC data to the MTC network 102 in a time controlled manner, according to the embodiments of the present invention. A variety of computer-readable storage media may be stored in and accessed from the memory elements. Memory elements may include any suitable memory device(s) for storing data and machine-readable instructions, such as random access memory, erasable programmable read only memory, electrically erasable programmable read only memory, hard drive, removable media drive for handling memory cards, Memory Sticks, etc.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 402. For example, a computer program may include machine-readable instructions capable of transmitting the MTC data to the MTC network 102 and applying an HPLMN timer value received from the MTC network 102 upon transmitting the MTC data, according to embodiments of the present invention. The program may be included on a storage medium and loaded from the storage medium to a hard drive in the non-volatile memory. The machine-readable instructions may cause the MTC device 104A to encode according to the various embodiments of the present invention.

The transceiver 408 transmits the MTC data to the MTC network 102 and receives a notification message including an HPLMN timer value from the MTC network 102 upon transmission of the MTC data. The bus 410 interconnects various components of the MTC device 104A. The communication interface 410, the display 414, the input device 416, and the cursor control 418 are well known to persons having ordinary skill in the art, and therefore, a detailed explanation of these components is omitted for clarity and conciseness.

Although, the foregoing description is made with reference to using an HPLMN timer value to control sleep and wake time of the MTC devices 104A-N, embodiments of the present invention can be practiced using any other specified timer value. Furthermore, the various devices, modules, selectors, estimators, etc. according to embodiments of the present invention may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods according to embodiments of the present invention may be embodied using transistors, logic gates, and electrical circuits, such as application specific integrated circuits.

Although the present invention has been shown and described with reference to certain embodiments thereof, it will be understood by those skilled in the art that various changes in form and detail may be made therein without departing from the scope of the present invention.

The invention claimed is:

1. A method performed by a Machine-to-Machine (M2M) type Communication (MTC) device for communicating MTC data in a MTC network environment, the method comprising:
   receiving a first message including a timer value from an MTC network;
   entering an inactive mode for a duration equal to the timer value, upon receiving the first message including the timer value;
   upon an expiration of the timer value, entering an active mode from the inactive mode and determining a size of MTC data that the MTC device is allowed to transmit during an active period of the MTC device by querying the MTC network via a camped network cell;
   transmitting the MTC data to an MTC server associated with the MTC device via the MTC network during the active mode of the MTC device based on the determination; and
   receiving a second message including a new timer value from the MTC network, upon successful transmission of the MTC data.

2. The method of claim 1, wherein the MTC device repeats, upon completion of the transmission of the MTC data, receiving the first message, entering the inactive mode, and entering the active mode.

3. The method of claim 1, wherein the MTC device receives the first message during an initial network attach procedure with the MTC network.

4. The method of claim 1, wherein entering the inactive mode upon receiving the first message including the timer value for the duration equal to the timer value comprises:
   applying the timer value included in the first message received from the MTC network; and
   entering the inactive mode for a duration equal to the applied timer value.

5. The method of claim 1, wherein the timer value is a dynamic Home Public Land Mobile Network (HPLMN) timer value.

6. The method of claim 1, wherein transmitting the MTC data to the MTC server associated with the MTC device via the MTC network during the active mode of the MTC device comprises:
   automatically performing a scanning operation to determine an availability of a network cell within a coverage area of the MTC device;
   determining whether any network cell is found within the coverage area of the MTC device during the scanning operation;
   camping, if a network cell is found within the coverage area during the scanning operation, on the found network cell for transmitting the MTC data to the MTC server; and
   if a network cell is not found within the coverage area during the scanning operation, repeating automatically performing the scanning operation and determining whether any network cell is found within the coverage area during the scanning operation until a network cell within the coverage area is found.

7. The method of claim 1, wherein in transmitting the MTC data to the MTC server associated with the MTC device via the MTC network, the determined size of the MTC data is at least equal to the size of the MTC data transmitted to the MTC network during the active period.

8. A method performed by a Machine-to-Machine (M2M) type Communication (MTC) network for managing at least one MTC device in an MTC network environment, comprising:
sending, to the at least one MTC device, a first message including a timer value, wherein the timer value indicates an inactive period associated with the at least one MTC device;
receiving, upon the expiration of the timer value, a query from the at least one MTC device to determine a maximum length of MTC data allowed for transmission by the at least one MTC device;
determining a length of the MTC data allowed for transmission by the at least one MTC device during an active period of the at least one MTC device;
communicating, to the at least one MTC device, length information based on the determined length of the MTC data allowed for transmission by the at least one MTC device during the active period;
receiving, from the at least one MTC device, the MTC data intended for an associated MTC server via an associated network cell, upon an expiration of the timer value associated with the inactive period based on the length information; and
transmitting a second message including a new timer value to the at least one MTC device, upon successful reception of the MTC data.

9. The method of claim 8, wherein the MTC network repeats, upon completion of the reception of the MTC data, sending the first message and receiving the MTC data.

10. The method of claim 8, wherein the timer value is a dynamic Home Public Land Mobile Network (HPLMN) timer value.

11. The method of claim 8, wherein the MTC network sends the first message including the timer value to the at least one MTC device during an initial network attach procedure with the at least one MTC device.

12. A Machine-to-Machine (M2M) type Communication (MTC) device for communicating MTC data in an MTC network environment, comprising:
a transceiver configured to receive a first message including a timer value from an MTC network; and
a processor configured to
enter an inactive mode for a duration equal to the timer value, upon receiving the first message including the timer value,
enter an active mode from the inactive mode and determine a size of MTC data that the MTC device is allowed to transmit during an active period of the MTC device by querying the MTC network via a camped network cell, upon an expiration of the timer value,
control the transceiver to transmit the MTC data to an MTC server associated with the MTC device via the MTC network during the active mode of the MTC device based on the determination, and
control the transceiver to receive a second message including a new timer value from the MTC network, upon successful transmission of the MTC data.

13. The device of claim 12, wherein the processor repeats, upon completion of the transmission of the MTC data, receiving the first message, entering the inactive mode, and entering the active mode.

14. The device of claim 12, wherein the transceiver receives the first message during an initial network attach procedure with the MTC network.

15. The device of claim 12, wherein the processor is further configured to apply the timer value in the first message received from the MTC network, and to enter an inactive mode for a duration equal to the applied timer value.

16. The device of claim 12, wherein the timer value is a dynamic Home Public Land Mobile Network (HPLMN) timer value.

17. The device of claim 12, wherein the processor is further configured to automatically perform a scanning operation to determine an availability of a network cell within a coverage area of the MTC device, to determine whether any network cell is found within the coverage area of the MTC device during the scanning operation, to camp, if a network cell is found within the coverage area during the scanning operation, on the found network cell for transmitting the MTC data to the MTC server, and if a network cell is not found within the coverage area during the scanning operation, to repeat automatically performing the scanning operation, and to determine whether any network cell is found within the coverage area during the scanning operation until a network cell within the coverage area is found.

18. The device of claim 12, wherein the determined size of the MTC data is at least equal to the size of the MTC data transmitted to the MTC network during the active period.

19. A Machine-to-Machine (M2M) type Communication (MTC) network for managing at least one MTC device in an MTC network environment, comprising:
at least one network cell;
at least one MTC server; and
a processor configured to
control the at least one network cell to send, to the at least one MTC device, a first message including a timer value indicating an inactive period associated with the at least one MTC device,
control the at least one MTC network cell to receive, upon an expiration of the timer value, a query from the at least one MTC device to determine a maximum length of MTC data allowed for transmission by the at least one MTC device,
determine a length of MTC data allowed for transmission by the at least one MTC device during an active period of the at least one MTC device,
control the at least one MTC network cell to communicate, to the at least one MTC device, length information based on the determined length of the MTC device, allowed for transmission by the at least one MTC device during the active period,
control the at least one network cell to receive, from the at least one MTC device, the MTC data intended for an associated MTC server from among the at least one MTC server via an associated network cell, upon an expiration of the timer value associated with the inactive period based on the length information, and
control the at least one network cell to transmit a second message including a new timer value to the at least one MTC device, upon successful reception of the MTC data.

20. The network of claim 19, wherein the processor controls the at least one MTC network cell to repeat, upon completion of the reception of the MTC data, sending the first message and receiving the MTC data.

21. The network of claim 19, wherein the timer value is a dynamic Home Public Land Mobile Network (HPLMN) timer value.

22. The network of claim 19, wherein the at least one network cell sends the first message including the timer value to the at least one MTC device during an initial network attach procedure with the at least one MTC device.

\* \* \* \* \*